L. I. TODD.

Rumbler for Cleaning Casting.

No. 8,310. Reissued July 2, 1878.

WITNESSES:

Forde R. Smith

Chas B. Stoughton

INVENTOR:

Lyman I. Todd by Munday & Evarts his attys.

UNITED STATES PATENT OFFICE.

LYMAN I. TODD, OF CHICAGO, ILLINOIS.

IMPROVEMENT IN RUMBLERS FOR CLEANING CASTINGS.

Specification forming part of Letters Patent No. 163,034, dated May 11, 1875; Reissue No. 8,310, dated July 2, 1878; application filed November 21, 1877.

*To all whom it may concern:*

Be it known that I, LYMAN I. TODD, of the city of Chicago, in the county of Cook and State of Illinois, have invented an Improved Rumble or Cylinder for Cleaning Castings, Scrap Metal, Skimmings, and Sweepings, of which the following is a specification:

My apparatus consists in a revolving cylinder provided with an opening for the introduction of articles, and a door for closing the same tightly, a water-pipe connection for the introduction of water within it, and openings on the end or head center for its egress, so placed above and in relation to a water-tank receptacle as to discharge the water from the openings on the end or head into the tank as the cylinder revolves, and also at the same time so located in relation to a shelf or tray as to discharge its contents of articles thereon from the opening when the door is removed, such tray being so located and related to the water-tank as to be above the surface of the water therein, and as to discharge the drippings from among the discharged articles into the water-tank. This shelf, tray, or receptacle has opening in its lower side, which permit the water so released to run down into the tank. The water-pipe should have a cock, for shutting off the flow of water when the process of cleaning has been completed.

Figure 1:
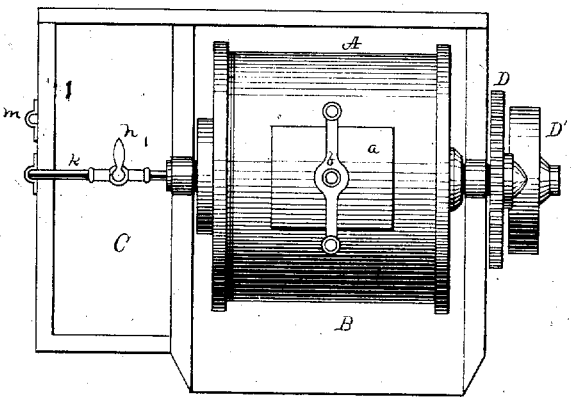
Figure 2:
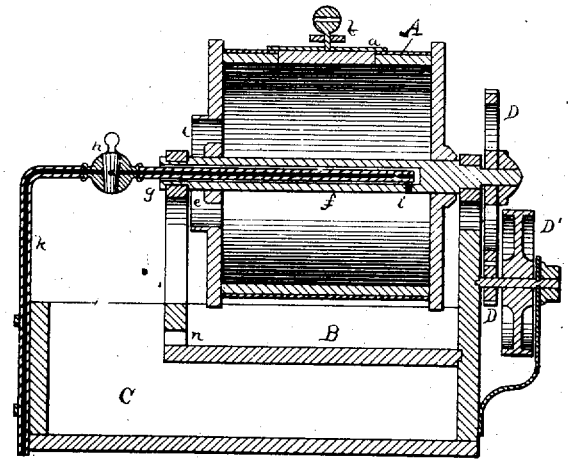

Figure 1 is a top view of my improved cleaning-mill. Fig. 2 is a central vertical section of the same.

A is a metal cylinder, secured upon a shaft, *f*, which is hollowed from its outer end to a point near the inner end of the cylinder. One end of cylinder A is solid or imperforate; the other end is provided with openings *e* around the shaft *f*. I provide an opening in the side of the cylinder, through which the castings may be inserted. Said opening is closed by a more or less water-tight cover, *a*, held in place by a suitable device, *b*. The cylinder A is lined with wood, to prevent fine work from being injured by the hard iron surface of the cylinder, and the pieces of wood are placed edge to edge. *k* is a supply-tube, and passes into the hollow shaft *f*, supplying it with water, which passes thence through holes *i* in the shaft into the cylinder. *h* is a stop-cock, for regulating the flow of water into tube *k*. B is a shelf or receptacle, into which the castings can be emptied after they have been cleaned by attrition in water within the cylinder A. C is a tank beneath the cylinder A and shelf or receptacle B, and into which the water flows from the opening *e* of the cylinder, which has an annular lip, and through openings *n* from receptacle B. Said tank is provided with an overflow-pipe, *m*. The cylinder may be rotated by gear-wheels D D and driving-pulley D or in any other convenient manner.

The operation of my invention is as follows: The castings to be cleaned are placed in the cylinder through the opening provided for that purpose. The cover A to said opening is then secured in place by the fastening device *b*, which makes the cylinder comparatively water-tight up to the openings *e* in one of its ends or heads, as shown in Fig. 2. The mill may then be rotated at the proper speed by means of the gear-wheels and driving-pulley, while at the same time water is permitted to flow into the cylinder through the pipe *k* and openings *i*. The cylinder will be filled with water up to the end outlets *e*, through which the surplus water will flow out, carrying off most of the sand and dirt. The constant stream of pure water flowing into cylinder A during the process of cleaning the castings will carry off most of the sand and other débris as it is removed from the castings.

By the use of my invention pieces of scrap metal, skimmings, and sweepings may be most thoroughly cleaned before remelting.

During the process of tumbling and trituration of the contents of the rumble, small fragments of metal become detached from the edges of the castings and otherwise, some of them being very fine and others very much laminated. More or less of these fragments will find their way into the tank C, either directly or by being washed off from the shelf or tray B, where they will settle to the bottom and collect until in sufficient mass to warrant their being carefully treated by themselves in the rumble. So, also, in the case of scrap and defective castings in process of cleaning before remelting. A very considerable saving of metal is thereby effected, which goes almost entirely to waste from the rumble in general use. When the castings are of brass or other like metals, this item of economy becomes of importance, and in proportion to the amount of work done.

The cylinder is intended to be practically or substantially closed on the circumference, first, by the closely-joined wooden lining, and, second, by the external covering of metal, the outlets for sand and débris being placed around the shaft of the cylinder, and preferably on or in one end or head thereof—an arrangement which detains a body of water in the cylinder, permitting the escape only of the excess of water admitted. The water-tank C is provided with an outflow-opening, connecting with a pipe for conducting the overflow away. This opening is placed well up on the end of the water-tank, or side, if more convenient. Or the side or end of the tank is made lower at some point, but in such manner as to retain a body of water below it in the tank, wherein all particles of metal which, assisted by the agitation of the cylinder, may have escaped into the tank may be detained and saved.

I am aware of the invention shown and described in the Letters Patent to Nathaniel C. Sawyer, dated October 2, 1866, No. 58,487, and that he therein shows a revolving cylinder, arranged to turn upon a horizontal shaft, consisting of a water-pipe perforated at intervals to allow the water to pass into the cylinder and to contain water, in which the article therein mentioned is immersed while being treated; and I hereby disclaim the same, both as to the particular devices named and as to their combination.

I claim as my invention—

1. The rumble A, in combination with the tank C, provided with the shelf B, for the purpose set forth.

2. The rumble for cleaning castings constructed with a lining of wood, substantially as specified.

3. The process of cleaning castings, which consists in subjecting them to attrition while they are immersed in water, and wherein the water serves to facilitate the cleaning, and also acts as a cushion to prevent injury from the attrition, by the means and in the manner substantially as specified.

LYMAN I. TODD.

Witnesses:

JNO. H. BURGH,

ROBT. BAWN.